May 2, 1944.  S. VARGA  2,347,855
METHOD AND MEANS FOR PROTECTING PIPE
Filed May 10, 1940
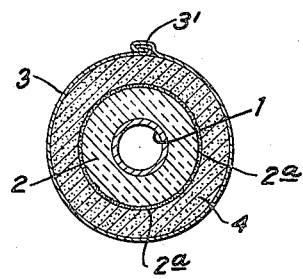
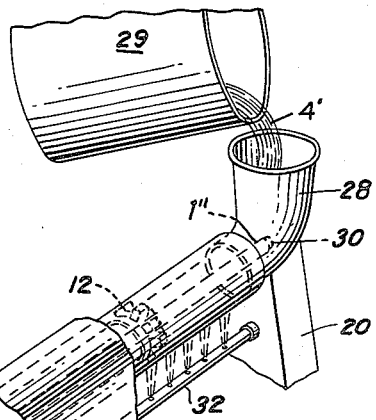
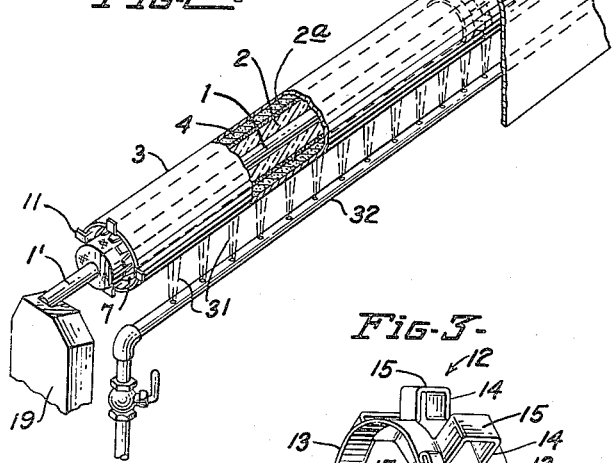
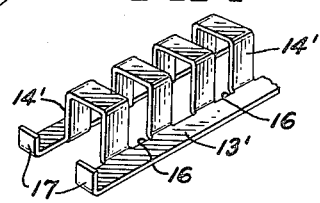
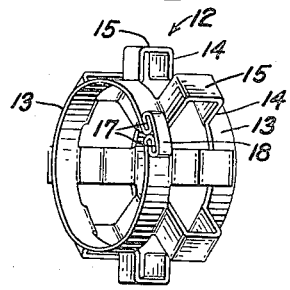
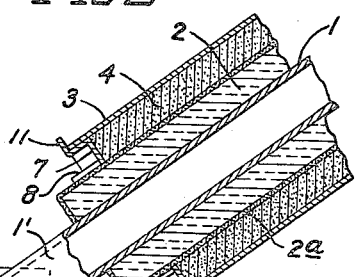
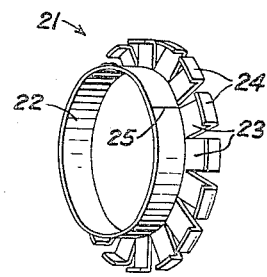
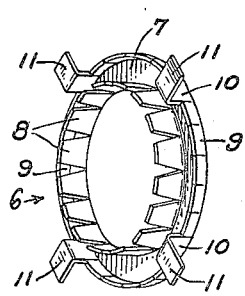
INVENTOR.
STEPHEN VARGA
BY
ATTORNEY Patented May 2, 1944

2,347,855

UNITED STATES PATENT OFFICE 2,347,855

METHOD AND MEANS FOR PROTECTING PIPE

Stephen Varga, East Palo Alto, Calif., assignor, by mesne assignments, to Albert A. Durant, Honolulu, Territory of Hawaii Application May 10, 1940, Serial No. 334,385

4 Claims. (Cl. 154—28)

This invention relates to the protection of metal pipe lines from the action of the elements generally as well as against electrolysis, also heat interchange through its walls, particularly such protected pipe which includes a concentric layer of bitumen, asphaltum, or coal tar pitch, or similar compounds or admixture thereof, surrounding the pipe or surrounding a thermal insulating layer first embracing the pipe.

The principal object of the invention is to provide an improved method to facilitate the making of such protected piping, as well as improved features contributing to the carrying out of the method.

Particular features and advantages of the improvements will appear in the following description and appended claims.

In the drawing—

Fig. 1 is a cross sectional view of a pipe resulting from the method of my invention.

Fig. 2 is a perspective view of a pipe being put through the step of applying the protecting layer of pitch or tar.

Fig. 3 is an enlarged perspective view of a collar or spider device used to concentrically space the outer shell of the pipe assemblage.

Fig. 4 is a perspective of a strip of sheet metal notched and folded in a manner for producing the spacing device of Fig. 3.

Fig. 5 is an enlarged end view of the flange joint of the device of Fig. 3.

Fig. 6 is a perspective view of another (upper) form of spacing collar used for the carrying out of my method.

Fig. 7 is a perspective view of the lower end closing and spacing collar used for the carrying out of my method.

Fig. 8 is a longitudinal cross sectional view of the lower end portion of the completed pipe supported in the inclined position of Fig. 2.

Before describing the drawing and invention in detail, it may be said that the invention forms a much simpler and quicker manner of making protected or "insulated" piping of the type shown in U. S. Patent No. 1,709,844 and a method cheaper to carry out, besides providing for the use of an exterior shell without openings of any kind and thus considerably extending the life of the completed pipe.

In further detail, and first referring to Fig. 1, the completed pipe comprises a metal pipe 1 which may be any common pipe or tube of steel, iron, copper, brass or any other metal depending on its particular use requirements, and it may be galvanized or otherwise plated, coated or surface protected either inside or out or both, as may be desired.

The inner pipe 1 is surrounded with a thick layer of heat insulating material 2 here indicated as the usual steampipe covering of magnesia, though it may be any thick layer of desired heat insulation such as felt, cork, corrugated paper, shredded or fibrous heat insulating material, etc., and preferably exteriorly enclosed in a layer of any sheet material, cloth or canvas wrapping 2ª preferably in adherent relation thereto when the material 2 is magnesia steam pipe covering.

Surrounding the canvas layer 2ª is a thick concentric solid layer of pitch, asphaltic, or bituminous layer 4, completely filling the space within the outer tubular shell 3 which may be of paper, fiber or sheet metal of any desired kind, and held into tubular form as by a longitudinally extending lock seam 3' or by any other desired means.

The outer shell 3 is spaced concentrically from the thermal insulation 2 by any number of spacing collars or spiders 12 best shown in Fig. 3 and which consists of a pair of collars 13 embracing and clamped to the cylindrical insulating material 2 and formed with a series of radially projecting arms having side walls 14 and outer walls 15 which contact the inner wall of the outer cylindrical shell 3. This spacing collar is formed of a flat strip 13' (see Fig. 4) of sheet metal notched out with spaced notches 16 and bent longitudinally to form the standing arms 14' as indicated in Fig. 4, and after which the strip is bent around the insulation cylinder 2 or a forming cylinder of similar size to form the spacing collar of Fig. 3. To secure the spacing collar 12 in place on the cylinder 2, I preferably first bend the extreme ends of both margins upward as indicated at 17 in Figs. 4 and 5, and then when in position on the cylinder 2 I apply an inverted U shaped strip of metal 18 over the upwardly standing ends 17 with the legs of the U pointing downwardly (as indicated in Fig. 5) and thereafter force the U strip down flat against the collar flange portion 13 to the position shown in Fig. 3 and which will draw the collar tightly around the cylinder 2, or instead of this, the collars may be secured in place or contracted upon the cylinder 2 by simply twisting a wire about them, or extending sheet metal straps about them.

After the pipe has been covered with the heat insulation 2, 2', and the desired number of collars 12 have been spacedly secured about it, the assemblage is pushed into the cylindrical shell or casing 3 and the space within the shell 3 is filled with molten pitch, or asphalt to form a thick solid layer impervious to water, alkalis, acids, electrolytic action, etc., and which layer is in tightly adherent relation to both the outer surface of cylinder 2 (or rather 2') as well as the inner surface of outer shell 3.

As such insulated and protected pipes are wanted in all lengths running up to twenty feet or more, it has been heretofore thought necessary to provide side openings at spaced intervals along the outer shell through which to pour the melted pitch, while the assemblage lies horizontally, and as shown in said Patent No. 1,709,844. I have found that better and quicker results can be obtained by standing the pipe assemblage including the outer shell 3 in an inclined position and then quickly pouring the molten mass of asphalt or pitch into the upper end of the outer shell space while closing off the lower end. This is possible only if the molten mass is much hotter than necessary to melt it, preferably as for example in the case of a No. 10 penetration asphalt a temperature of 400 degrees Fahrenheit, and preferably maintaining the outer shell hot by the application of heat thereto.

The preferred arrangement for pouring is shown in Fig. 2 wherein the pipe assemblage is slantingly supported on blocks 19, 20, or planks, the lower end of the outer shell space is closed as by a special flange or collar 6 (see Fig. 7), through which the lower end 1' of pipe 1 projects to rest in block 19, while the upper end of the pipe 1" is plugged or capped as at 30 and surrounded by a funnel 28 which rests in block 20 and receives the molten asphalt or pitch from a melting cauldron 29 or from any steam melting equipment not shown, and guides the hot liquid mass to the upper end of the outer shell space for quickly flowing along the same and through any number of the sheet metal spacers 12 to completely fill the space.

One of the spacers 12 may also be used in the upper end of the shell adjacent the lower end of the funnel, or the special sheet metal centering flange shown in Fig. 6 may be used, but preferably the spacer is omitted from the upper end of the shell until after the pouring of the pitch so as not to impede the flow of the molten material, and as soon as the required amount has been flowed in, the filled assemblage is stood vertical and the centering flange of Fig. 6 is pushed in to insure concentricity until the molten mass hardens, and after which both lower and upper end flanges are preferably forcibly removed, as by a sharp blow, or quick localized heating as by a plumber's torch, so as to expose a clean asphalt or pitch surface for the joining of the pitch from the next piece of pipe, or rather the similar pitch filling used to cover the pipe couplings or joints between the several lengths of pipe. The end flanges are preferably left in position until the pipe is laid in place to prevent any possible slow movement of the pitch at the ends as might otherwise happen in some hot climates.

While the molten asphalt if very hot, may be poured into the outer shell space without the application of extraneous heat to the assemblage, especially in hot weather, still, in cold places, and for long lengths of pipe the operation is facilitated by heating the assemblage as by a row of gas flames 31 issuing from a long burner pipe 32 and with the assemblage preferably further protected from loss of heat by a sheet metal or other guard plate 33 extending the length of the assemblage, though shown broken off in the drawing. Any other method of heating may be used.

Upper centering flange 21 is preferably of sheet metal formed into a collar or sleeve portion 22 to frictionally embrace the insulation cylinder 2 and having radially extending fins 23 each with a right-angularly extending toe 24 at its end to engage the inner wall of the outer shell. The collar portion 22 may have an open joint at 25 so that it may easily be sprung over the insulation cylinder 2.

Lower end spacing and closing flange or collar 6 is similar in form to the upper end flange 21 except that it is formed with a solid annular plate portion 7 for closing off the lower end of the tar or pitch space between the outer shell and cylindrical insulation member 2, also the inner collar which resiliently grips the insulation cylinder is serrated as at 8, as is also the outer flange 9 which goes inside of shell 3, and several portions 10 of the outer flange are extended and bent outwardly as at 11 for the lower end of the outer shell 3 to abut against when the parts are assembled as shown in Fig. 2.

The lower end closing flange 6 is preferably a short distance above the lower end of cylindrical member 2 as indicated in both Figs. 2 and 8, so as to facilitate forming a joint between one section of the pipe and another, and the projecting portions 11 of the flange 6 offer portions to grasp or strike in removing the flange. The same form of flange may be used for centering the upper end if desired, though the other one described is preferred.

While it is possible to pour the molten pitch into the outer shell space with the assemblage standing vertically, the positioning of the assemblage at an incline as shown in Fig. 2 overcomes the danger of splashing of the hot pitch and entrapping of air to lower the effectiveness of the pitch layer, as the compactness and density of the pitch layer is the most important factor insuring long life and protection from the elements, and this may be depended upon if the assemblage be inclined when the pouring is done.

While the invention as described appears almost obvious in its simplicity, yet in fact it is not so, as my experience over years in the production of similar pipe by more expensive and difficult methods has proven.

On account of the various pitches, such as asphaltum, coal tar pitch and pitchy mixtures which may be used to fill the outer shell space, I use the word "pitch" in my appended claims as covering any suitable pitchy materials or mixtures thereof, or other meltable waterproof substances.

I therefore claim:

1. An assemblage for making a protected pipe comprising an outer imperforate tubular shell of sheet material, a pipe with a layer of heat insulating material surrounding it spaced within said tubular shell and a sheet metal collar embracing said heat insulating material and having radially projecting spaced spider arms engaging said shell holding said pipe and insulating material concentrically spaced within said shell, and means closing one end only of said shell with said pipe and insulating material extending beyond the closing means, the opposite end of the space within said imperforate shell being open to receive a liquid cementitious material.

2. In an assemblage as set out in claim 1 said collar being a strip of sheet metal with a series of spaced open slots extending transversely along its central portion, and bent to form a series of inverted U shaped arms of the metal between the slots projecting above the plane of the strip and the strip bent around the insulating material enclosing said pipe.

3. In an assemblage as set out in claim 1 said collar being a strip of sheet metal with a series of spaced open slots extending transversely along its central portion, and bent to form a series of inverted U shaped arms of the metal between the slots projecting above the plane of the strip and the strip bent around the insulating material enclosing said pipe, the two opposite ends of said strip bent outwardly and overlapped by an inverted U shaped sheet metal clip all forced substantially flat against the collar and contracting same snugly in place.

4. The method of making protected pipe which comprises covering a length of pipe with heat insulation, spacedly supporting the covered pipe within a relatively large tubular shell by means affording straight through passages along the space between the pipe and shell and with the upper portion of the pipe within the shell left unsupported, supporting the assemblage on an incline with the lower end of the space within the shell closed, and while thus supported pouring molten pitch into the upper end of said space to fill the same and before the pitch has solidified inserting spacing means within the upper end of the shell to hold it concentric with the pipe and permitting the pitch to solidify.

STEPHEN VARGA.